United States Patent [19]

Perez et al.

[11] 4,206,891
[45] Jun. 10, 1980

[54] HELICOPTER PEDAL FEEL FORCE PROPORTIONAL TO SIDE SLIP

[75] Inventors: Ricardo L. Perez, Plantsville; Ronald E. Barnum, Trumbull; Franklin A. Tefft, Killingworth, all of Conn.

[73] Assignee: United Technologies Corporation, Hartford, Conn.

[21] Appl. No.: 955,724

[22] Filed: Oct. 26, 1978

[51] Int. Cl.² .............................................. B64C 11/34
[52] U.S. Cl. ................... 244/17.13; 244/235; 244/178; 244/182; 244/196
[58] Field of Search ............... 244/17.11, 17.13, 83 D, 244/83 E, 86, 178, 182, 196, 197

[56] References Cited

U.S. PATENT DOCUMENTS

| | | | |
|---|---|---|---|
| 3,099,421 | 7/1963 | Gerstine | 244/17.13 |
| 3,711,042 | 1/1973 | Rempfer et al. | 244/17.13 X |
| 3,733,039 | 5/1973 | O'Connor et al. | 244/17.13 X |
| 4,003,532 | 1/1977 | Adams, Sr. et al. | 244/17.13 |
| 4,067,517 | 1/1978 | Barnum | 244/17.13 |
| 4,078,749 | 3/1978 | Johnson, Jr. | 244/17.13 X |

OTHER PUBLICATIONS

Sikorsky Aircraft, U.S. Army Electronics Command, Ft. Monmouth, N.J., Five Week CH-54B AFCS Direct/General Maintenance Course, 9-8-1969, pp. 1-33.

*Primary Examiner*—Charles E. Frankfort
*Assistant Examiner*—Reinhard J. Eisenzopf
*Attorney, Agent, or Firm*—M. P. Williams

[57] ABSTRACT

The yaw channel of a helicopter, which includes a yaw servo having a yaw trim valve operable to automatically hold heading, and at cruise speeds alternatively operable to provide controlled yaw for coordinated turns, which is normally disengaged by switches located on the pedals, is selectively allowed to remain engaged at cruise speeds so that if the pilot induces commands in yaw by means of the pedals, the pedal linkage must be forced against the position of the trim piston established by the heading hold or coordinated turn input commands to the yaw trim valve, thereby giving the pilot pedal force feel as a consequence of the resilient connection to the trim piston, which provides an indication to the pilot of the amount of side slip he is creating, thereby to avoid destructive overloading of the tail rotor.

2 Claims, 1 Drawing Figure

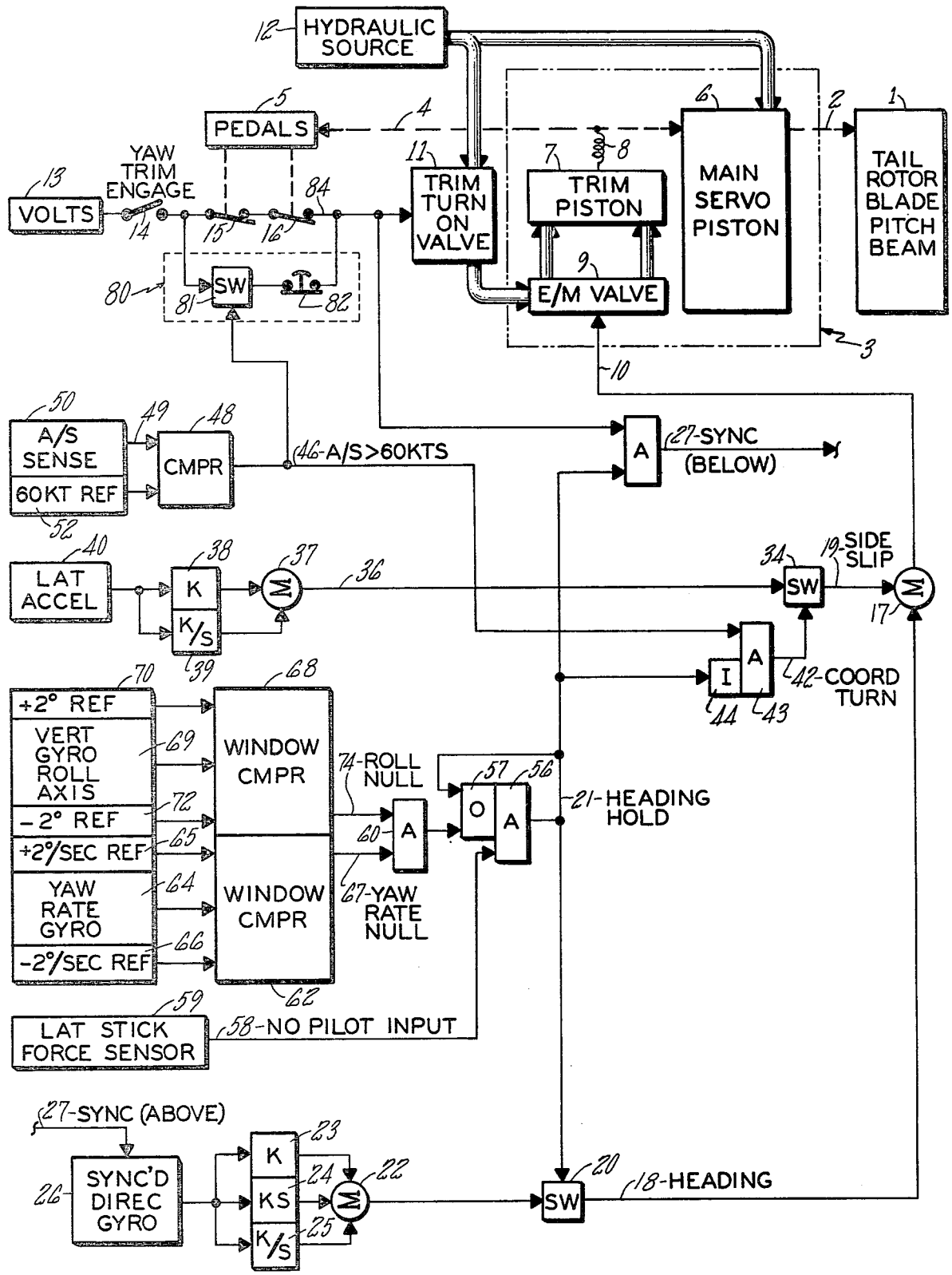

HELICOPTER PEDAL FEEL FORCE PROPORTIONAL TO SIDE SLIP

The invention disclosed herein was made under or in the course of a contract with the Department of the Navy.

BACKGROUND OF THE INVENTION

1. Field of Art

This invention relates to helicopter controls, and more particularly to utilization of the yaw trim controls of a helicopter to establish force feel to the pedals, thereby to provide the pilot with a cue to tail rotor loading from side slip commands.

2. Description of the Prior Art

In primitive aircraft control systems, including those of a helicopter, the controls manipulated by the pilot were mechanically linked directly to the aerodynamic surfaces being controlled thereby. Aerodynamic resistance to increased aerodynamic loading of these surfaces provided a feel to the pilot of the demands which he is making on the aircraft. However, use of servo systems to assist the pilot in the movement of control surfaces isolates the pilot's feel in the controls from the aerodynamic resistance to increased loading of the surfaces. Therefore, it has been known to provide artificial feel force into the controls of helicopters and other aircraft. Examples of artificial feel force appear in O'Connor and Tefft U.S. Pat. No. 3,733,039 and in Johnson U.S. Pat. No. 4,078,749.

The yaw channel of a modern helicopter controls movement about the yaw axis by means of the tail rotor blade pitch (angle of incidence). This is physically effected by means of a pitch change beam mechanically connected to a yaw servo which provides mechanical force amplification to inputs to the servo from the linkage connected to the pedals. Such a servo, as is known, has a main piston to operate the tail rotor blade pitch beam, to adjust the pitch of the tail rotor blades.

In helicopters having an automatic flight control system (AFCS), the servo has a trim function for automatic pilot control over the yaw channel. In such case, the pedal linkage is mechanically connected, through a resilient means such as springs, to a trim piston. The trim piston is hydraulically controlled by an electromagnetic trim valve, the electric input of which is a function of autopilot control system outputs. The trim valve is in turn rendered operative by opening a trim turn on valve to supply hydraulic fluid under pressure to the trim valve. On the other hand, when the trim valve is disengaged by shutting off the hydraulic fluid to it, the piston is free to move within its hydraulic fluid environment by means of a small bypass orifice, whereby the piston only provides damping to the pedals. The pedal linkage controls the main piston of the yaw servo, whether this linkage is adjusted by force on the pedals or by hydraulic action against the trim piston in response to autopilot commands. When the trim valve is engaged but there is no electric input to it, the trim piston assumes a neutral position. At any position of the piston (a neutral position when trim is on but no autopilot input is provided to it, or the trim position caused by the autopilot function), the pedal linkage may move against the force of springs by which the pedals are mechanically connected to the trim piston. When there is no force on the pedals (feet off), an electric signal to the electromagnetic trim valve will hydraulically adjust the position of the trim piston, which will in turn alter the pedal linkage position and thereby move the pedals accordingly. If the pedal linkage is held in its rest position by the pilot, the trim piston can move, in response to autopilot signals, against the resilient connection to the pedal linkage. But the linkage does not move when the pedals are held at rest; so the pilot can override the autopilot, by holding the pedals at rest.

An example of a yaw autopilot channel, which provides the electrical input to the yaw trim valve, is described in Barnum U.S. Pat. No. 4,067,517. In an AFCS system, when the yaw trim function is selectively engaged by the pilot operating a yaw trim engage switch, the system will automatically provide heading hold control through the yaw trim valve at any speed (including hover) during straight flight. At speeds below cruise speed (such as below 60 knots), the inducement of a turn is sensed to block the heading hold signal, so that the heading hold function will provide no input to the yaw trim valve, and the trim piston will be at a neutral position; the pilot may control the turn (especially at low speeds and in hover) by the pedals. At cruise speeds, the inducement of a turn is sensed to engage a coordinated turn autopilot input to the yaw trim valve, so that yaw continues to be controlled automatically, but is governed to provide the necessary degree of side slip to coordinate a turn at the airspeed of the helicopter, with the amount of roll which the pilot has commanded. Provision of the automatic changeover between the heading hold autopilot function and the coordinated turn autopilot function at cruise speeds is disclosed in Adams and Johnson U.S. Pat. No. 4,003,532.

To avoid the possibility of the pilot fighting the autopilot system, by trying to induce a heading change with the yaw pedals at low speed, while the heading hold system tries to maintain the same heading automatically, or by trying to coordinate a rolled-turn at cruise speeds, switches have been provided in series with the yaw trim engage switch, which open when the related pedal is moved from the rest position. Therefore, any attempt by the pilot to control yaw by means of the pedals has resulted in closing the yaw trim turn on valve to thereby disengage the yaw trim function.

SUMMARY OF THE INVENTION

Objects of the invention include provision of pedal force feel in a helicopter flying at cruise speeds.

This invention is predicated on the fact that the pedal linkage is resiliently tied to the trim piston position, and movement thereof from the corresponding position of the piston will require a force proportional to the motion.

According to the present invention, the pedal switches which disengage the yaw trim function in a helicopter are bypassed automatically at cruise speeds. In accordance further with the invention, the automatic bypass feature may be selectively overridden by a pilot-actuated switch.

The present invention provides force feel in the pedals by maintaining the yaw trim function operative when at cruise speeds even if the yaw pedals are moved, whereby the magnitude of tail rotor loading is indicated in the feel of the pedals' motion required to overcome the trim position established by the autopilot command to the yaw trim valve. The invention is extremely simple and readily implemented in a wide variety of embodiments.

The foregoing and other objects, features and advantages of the present invention will become more apparent in the light of the following detailed description of an exemplary embodiment thereof, as illustrated in the accompanying drawing.

BRIEF DESCRIPTION OF THE DRAWING

The sole FIGURE herein comprises a simplified schematic block diagram of the yaw channel of a helicopter, including autopilot and trim functions, incorporating the present invention.

DETAILED DESCRIPTION

The following description deals in large part with the environment of the invention, all known in the art, as a foundation for the invention, which is quite simple.

Referring now to the drawing, the rotational position of a helicopter about its yaw axis is determined by the pitch (angle of incidence) of the tail rotor blades, which in turn is controlled by a blade pitch beam 1, positioned by a mechanical linkage 2 connected to a yaw servo 3, which in turn is driven through mechanical linkage 4 by the pilot's pedals 5. The yaw servo 3 may be any of a number of typical automatic flight control systems (AFCS) servos of the type used for many years in helicopters, having the trim capability described hereinafter. Specifically, the yaw servo 3 includes a main servo piston 6 which drives the linkage 2 in direct response to movement of the pedal linkage 4. The yaw servo 3 also includes a trim piston 7 which is resiliently connected to the linkage 4, as indicated simply herein by a spring 8. The rest or trim position of the trim piston may be controlled by an electromagnetic valve 9 in response to autopilot signals provided thereto on a line 10, whenever trim is engaged by supplying hydraulic fluid under pressure to the valve 9 through a trim turn on valve 11, from a source 12 of hydraulic fluid under pressure, which also supplies operating fluid to the main servo piston 6. The trim turn on valve 11 is operated in response to a suitable supply of voltage 13 when a yaw trim engage switch 14 is selectively actuated by one of the pilots, provided that pedal switches 15, 16 have not been opened by motion of the pedals from their rest positions.

With the yaw trim engage off (switch 14 open, as shown), the trim turn on valve 11 is closed, providing no hydraulic fluid to the valve 9. Under this condition, the trim piston 7, as is known, is free to move about its cylinder due to a bypass port which allows fluid to transfer between the opposite sides of the piston, and simply provides a damping factor to the motion of the piston 7. In such a case, any motion of the pedals 5 will cause a commensurate motion of the linkage 4 causing the main servo piston 6 to provide a corresponding motion through the linkage 2 to the pitch beam 1. The motion of the linkage 4 in this case is damped by the piston, but otherwise unimpeded. The resilient connection (depicted by the spring 8 in the drawing) provides no feel to the motion of the pedals in this instance because the piston 7 moves rather freely. And, concomitantly, since the piston 7 is not being driven by the valve 9, it contributes nothing to the motion of the linkage 4, notwithstanding any autopilot control signal which might be present on the line 10.

To provide automatic flight control in the yaw channel, the pilot will establish a desired heading, bring the pedals 5 to the rest position, to ensure that all of the pedal switches 15, 16 associated with his pedals will be closed, and then engage the yaw trim turn on valve 11, supplying hydraulic fluid from the source 12 to the valve 9. The valve 9 will then provide fluid to the piston 7 so as to control its position in response to the autopilot signal on the line 10, and motion of the piston 7 through the resilient connection (spring 8 herein) will move the linkage 4 so as to both provide a command to the main servo piston 7 and, at the same time, move the pedals 5. Because the electric signal on the line 10 will not only cause a change in tail rotor blade pitch but also move the pilot pedals, this is referred to as an outer loop control system, as is known in the art.

An example of automatic pilot apparatus for providing the signal on the line 10 is shown in the lower portion of the drawing. The signal on the line 10 is provided by a summing amplifier 17 in response to a heading signal on a line 18 or in response to a side slip signal on a line 19. The signal on the line 18 is provided, in response to a summing junction or amplifier 22, through a switch 20, which is actuated in response to a heading hold logical signal on a line 21. The summing junction or amplifier 22 sums the outputs of a proportional amplifier 23, a differential (or rate) amplifier 24, and an integrating amplifier 25, each of which is responsive to the output of a synchronized directional gyro 26. When the yaw trim and heading hold are engaged, any variation in the output of the directional gyro, from the output which it had at the time the yaw trim and heading hold are engaged, will cause a heading error signal to be provided to the amplifiers 23–25, and the resulting heading signal on the line 18 will drive the trim valve 9 in such a fashion as to provide a corrective yaw command through the trim piston 7 and the pedal linkage 4 to the main servo piston 6. The synchronizing of the directional gyro to the desired heading may be accomplished by a synch signal on a line 27 provided by an AND circuit 28 that senses the concurrent presence of trim engage and heading hold.

The signal on the line 19 is proportional to side slip and used during turns to command the correct amount of yaw to coordinate the turn, which is provided alternatively to the signal line 10 by means of the summing amplifier 17. The side slip signal on the line 19 is provided through a switch 34 from a signal line 36 that is responsive to a summing junction or amplifier 37, which provides the summation of a proportional amplifier 38 and a rate amplifier 39, both of which are responsive to a lateral accelerometer 40. The switch 34 is operated alternatively with the switch 20 above 60 knots, and is not operated at all below 60 knots, as a consequence of a coordinated turn signal on a line 42 generated by an AND circuit 43 that is responsive to an inverter 44, whenever the heading hold signal is not present on the line 21 provided that an airspeed greater than 60 knots signal is present on a line 46. This is generated by a compare circuit 48 which compares an airspeed signal on a line 49 from an airspeed sensor 50 with a suitable 60 knot reference voltage from a source 52. The airspeed sensor 50 may be a suitable, known transducer connected to the Pitot-static system of the helicopter.

Traditionally, the heading hold function was disengaged either by opening of the yaw trim engage switch 14, or in maneuvering the aircraft, by means of the switches 15, 16 associated with and operated by the pilot and/or copilot pedals 5. Thus any attempt to control the yaw of the helicopter automatically would disengage the heading hold. However, a more recent innovation is provision of the heading hold logic that generates the heading hold signal on the line 21 during essentially straight and level flight with no pilot inputs to the main rotor lateral cyclic pitch stick. This permits the pilot to roll into a turn without having to disengage the yaw trim channel, nor operate the yaw pedals.

The heading hold signal on the line 21 is generated by an AND circuit 56, which is co-responsive to the output of an OR circuit 57 (described hereinafter) and to a signal on a line 58 indicative of the fact that the pilot is not putting a significant input into lateral cyclic pitch stick position, as indicated by a lateral stick force sensor 59. This sensor may be of the general stick force sensing configuration described with respect to FIG. 2 of the aforementioned Adams and Johnson patent. On the other hand, some other form of indication of pilot induced roll command may be utilized, as desired, in any implementation of the present invention.

The OR circuit 57 responds to the heading hold signal on the line 21 to latch up the AND circuit 56, once it has operated, for so long as the no pilot input signal remains on the line 58. The initial operation of the AND circuit 56 depends on the OR circuit 57 receiving a signal from an AND circuit 60. The AND circuit 60 responds to the output of a window comparator 62 which compares the output of a yaw rate gyro 64 with reference voltages indicative of yaw rates of 2° per second provided by sources 65, 66 to provide a yaw rate null signal on a line 67. The output of the comparator 62 therefore indicates that sufficient yaw to coordinate a turn above 60 knots is not being commanded, which is further indication that the aircraft is not undergoing a turn at cruise speeds. The AND circuit 60 is further responsive to a window comparator 68 which compares the output of the vertical gyro roll axis 60 with ±2° of roll as indicated by reference sources 70, 72, to provide a roll angle null signal on a line 74. The output of the window comparator 68 is indicative of the fact that the aircraft roll is less than what normally would occur for a turn at speeds in excess of 60 knots. The AND circuit 56 is first operated by the concurrence of no pilot output with yaw rate and roll angle nulls. But it is latched up then to allow roll angle stability even if the yaw rate or roll angle exceed the null windows, so long as such excess is not pilot induced. Any pilot induced lateral command will remove the signal on line 58 so the AND circuit will turn off; and it will stay off even after the pilot retrims the lateral stick, once in the turn. The heading hold will reengage only after the turn is complete and the stick is trimmed.

All of the foregoing description relates only to the environment of the invention, to wit, an automatic flight control system yaw channel, employing an AFCS servo with heading hold and coordinated turn automatic pilot functions for controlling the AFCS servo. None of the apparatus or functions described in detail thus far are novel, all being known in the art.

The present invention comprises a bypass circuit 80 which includes an electronic switch 82 operable, in response to the airspeed greater than 60 knots signal on the line 46, to short-circuit the pedal switches 15, 16, provided that an override switch 82 is closed. Bypassing the pedal switches 15, 16 allows the pilot to provide yaw commands without disengaging trim, so that the trim piston will be maintained in some position, or a variable position, commanded by the autopilot signal on the line 10. Any deviation of the pedals from their rest position will require sufficient force so that the pedal linkage 4 can operate against the resilient connection (spring 8 herein) to the trim piston 7. The force necessary to overcome the resilient connection to the piston 7, so as to permit the pedal linkage 4 to deviate from the position that is established for it by the trim piston 7 in response to the autopilot signal 10, provides a commensurate force feel which is proportional to pedal position. Therefore, the pilot can command yaw with a feel in the pedals which will provide an indication to him of the severity of the command, and therefore the loading on the tail rotor blades. He can therefore judge the degree of rotor loading and avoid structural damage which can result from overloading. The override switch 82 may conveniently be placed in the pilot's cyclic stick or some other convenient position so that when flying above 60 knots, he can optionally not bypass the pedal switches 15, 16, but rather provide disengagement of yaw trim as a consequence of pedal operation, depending on the particular maneuver which he intends to perform. The switch 82 may alternatively be placed directly in the engage line, such as at the point designated by the numeral 84. Examples of usage of the present invention are maneuvers such as providing side slip to overcome the effects of crosswind gusts on landing approaches, evasive maneuvers, and the like.

The present invention is disclosed in an environment depicting a basically analog automatic pilot yaw channel; the invention has been implemented in such a form, and has also been implemented in an automatic flight control system employing digital computers, wherein the generation of the heading hold logic, the heading signal and the side slip signal have all been performed digitally. However, the servo system and the invention itself remain essentially as disclosed herein, even in an embodiment employing digital generation of the autopilot functions, which are not germane to the invention.

Thus although the invention has been shown and described with respect to an exemplary embodiment thereof, it should be understood by those skilled in the art that the foregoing and various other changes, omissions and additions in the form and detail thereof may be made therein and thereto, without departing from the spirit and the scope of the invention.

Having thus described a typical embodiment of our invention, that which we claim as new and desire to secure by Letters Patent is:

1. An improved helicopter, yaw channel having a yaw servo including a trim piston resiliently connected to the yaw pedal linkage, an electrically controlled yaw trim valve for controlling, when actuated, the position of the yaw trim piston in response to electric autopilot input signals thereto, a trim turn on valve for actuating the yaw trim valve by supplying hydraulic fluid under pressure thereto, a pilot actuable trim engage switch in series with pedal-actuated disengage switches for operating the trim turn on valve whenever the pedals are not moved from their rest position, in which the improvement comprises:
    means providing a cruise signal indicative of the helicopter flying at a speed in excess of a predetermined cruise speed; and
    means including a bypass switch responsive to said cruise signal for short-circuiting said pedal-actuated trim disengagement switches in response to said cruise speed signal indicating the helicopter is flying in excess of said predetermined cruise speed, whereby operation of the pedals requires a force to overcome said resilient connection to said trim piston.

2. The improvement according to claim 1 further comprising a normally closed, manually operable override switch connected in series with said bypass switch, said override switch, when actuated so as to be open, disconnecting said bypass means so as to avoid short-circuiting said disengage switches whenever said normally closed switch is selectively opened by the pilot.

* * * * *